United States Patent
Ramachandra

(10) Patent No.: US 10,225,603 B2
(45) Date of Patent: Mar. 5, 2019

(54) METHODS AND SYSTEMS FOR RENDERING MULTIMEDIA CONTENT ON A USER DEVICE

(71) Applicant: Wipro Limited, Bangalore (IN)

(72) Inventor: Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/463,573

(22) Filed: Mar. 20, 2017

(65) Prior Publication Data

US 2018/0262798 A1    Sep. 13, 2018

(30) Foreign Application Priority Data

Mar. 13, 2017 (IN) .............................. 201741008650

(51) Int. Cl.
| | |
|---|---|
| *H04N 21/431* | (2011.01) |
| *H04N 21/45* | (2011.01) |
| *H04N 21/472* | (2011.01) |
| *H04N 21/482* | (2011.01) |
| *G06F 17/30* | (2006.01) |

(52) U.S. Cl.
CPC ... *H04N 21/4318* (2013.01); *G06F 17/30828* (2013.01); *H04N 21/4532* (2013.01); *H04N 21/47217* (2013.01); *H04N 21/4828* (2013.01)

(58) Field of Classification Search
None
See application file for complete search history.

(56) References Cited

U.S. PATENT DOCUMENTS

| | | | | |
|---|---|---|---|---|
| 6,072,934 | A  * | 6/2000 | Abecassis | ............... A63F 13/10 348/E5.102 |
| 6,829,781 | B1 * | 12/2004 | Bhagavath | ........... H04N 21/235 375/E7.004 |
| 6,870,573 | B2 | 3/2005 | Yeo et al. | |
| 6,971,119 | B1 * | 11/2005 | Arsenault | .......... H04N 5/44543 348/E5.105 |
| 7,245,819 | B1 * | 7/2007 | Sanders | ............... G11B 27/034 386/241 |
| 7,620,651 | B2 | 11/2009 | Chea et al. | |
| 7,657,836 | B2 * | 2/2010 | Pan | ................... G06F 17/30787 715/719 |

(Continued)

OTHER PUBLICATIONS

Extended European Search Report issued in Application No. 17186979.5 mailed from the European Patent Office dated Feb. 19, 2018 (8 pages).

*Primary Examiner* — An Son P Huynh

(74) *Attorney, Agent, or Firm* — Finnegan, Henderson, Farabow, Garrett & Dunner L.L.P.

(57) ABSTRACT

In one embodiment, a method for rendering multimedia content on a user device is disclosed. The method includes receiving, by a content rendering device, multimedia content from a multimedia server. The multimedia content is stored in the multimedia server in form of chunks. The method includes transforming, by the content rendering device, at least one chunk of the multimedia content based on user preferences. The transforming comprises adjusting time duration of the multimedia content based on a user-defined time duration. Further, the method includes rendering, by the content rendering device, the transformed multimedia content on the user device.

17 Claims, 5 Drawing Sheets

(56) References Cited

U.S. PATENT DOCUMENTS

| | | | | |
|---|---|---|---|---|
| 7,694,318 B2* | 4/2010 | Konig | G06F 17/30802 | 725/32 |
| 7,796,857 B2* | 9/2010 | Hiroi | G11B 27/105 | 369/30.05 |
| 8,196,168 B1* | 6/2012 | Bryan | G11B 27/002 | 725/134 |
| 9,319,724 B2* | 4/2016 | Lewis, II | H04N 21/252 | |
| 9,538,232 B2* | 1/2017 | Carney | H04N 21/4331 | |
| 9,628,852 B2* | 4/2017 | Jarman | G11B 27/105 | |
| 9,736,503 B1* | 8/2017 | Bakshi | H04N 21/23424 | |
| 9,749,710 B2* | 8/2017 | Ramaswamy | H04N 21/812 | |
| 2002/0097984 A1* | 7/2002 | Abecassis | G11L 319/02 | 386/344 |
| 2002/0120931 A1* | 8/2002 | Huber | H04N 7/17318 | 725/34 |
| 2002/0170068 A1* | 11/2002 | Rafey | G06F 17/30823 | 725/112 |
| 2002/0184047 A1* | 12/2002 | Plotnick | G06Q 30/0258 | 705/1.1 |
| 2004/0017389 A1* | 1/2004 | Pan | G06F 17/30787 | 715/723 |
| 2004/0197088 A1* | 10/2004 | Ferman | G06F 3/0481 | 386/251 |
| 2005/0060641 A1* | 3/2005 | Sezan | H04L 12/2805 | 715/202 |
| 2005/0132401 A1* | 6/2005 | Boccon-Gibod | G11B 27/002 | 725/34 |
| 2006/0120624 A1* | 6/2006 | Jojic | G06F 17/30843 | 382/284 |
| 2007/0079325 A1* | 4/2007 | de Heer | H04N 7/17318 | 725/32 |
| 2007/0150930 A1* | 6/2007 | Koivisto | G06F 17/30884 | 725/134 |
| 2007/0154169 A1* | 7/2007 | Cordray | H04N 5/44543 | 386/230 |
| 2007/0157249 A1* | 7/2007 | Cordray | G06F 3/0482 | 725/58 |
| 2007/0157260 A1* | 7/2007 | Walker | H04N 7/163 | 725/86 |
| 2008/0040740 A1* | 2/2008 | Plotnick | G11B 27/005 | 725/32 |
| 2008/0123738 A1* | 5/2008 | Katsavounidis | H04N 19/159 | 375/240.01 |
| 2009/0010426 A1* | 1/2009 | Redmond | H04L 29/06027 | 380/29 |
| 2009/0094159 A1* | 4/2009 | Cunningham | G06Q 30/02 | 705/51 |
| 2009/0249223 A1* | 10/2009 | Barsook | H04N 7/15 | 715/753 |
| 2010/0086277 A1* | 4/2010 | Craner | H04N 5/76 | 386/278 |
| 2010/0251295 A1* | 9/2010 | Amento | G11B 27/034 | 725/38 |
| 2011/0119324 A1* | 5/2011 | Tian | H04N 21/4333 | 709/203 |
| 2011/0239078 A1* | 9/2011 | Luby | H04N 21/23106 | 714/752 |
| 2012/0093476 A1* | 4/2012 | Mountain | H04N 21/4312 | 386/230 |
| 2013/0246643 A1* | 9/2013 | Luby | H04N 21/23439 | 709/231 |
| 2014/0109134 A1* | 4/2014 | Gauthier | G06Q 30/00 | 725/34 |
| 2014/0161417 A1* | 6/2014 | Kurupacheril | H04N 5/76 | 386/241 |
| 2014/0189517 A1* | 7/2014 | Hughes | G06F 3/04842 | 715/719 |
| 2014/0219630 A1 | 8/2014 | Minder | | |
| 2014/0282788 A1* | 9/2014 | Inao | H04N 21/23106 | 725/115 |
| 2015/0293928 A1 | 10/2015 | Chen et al. | | |
| 2016/0044388 A1* | 2/2016 | Guionnet | H04N 21/8456 | 725/32 |
| 2016/0133296 A1 | 5/2016 | Becherer | | |
| 2017/0200471 A1* | 7/2017 | Gilson | G11B 27/036 | |
| 2017/0230731 A1* | 8/2017 | Amento | H04N 21/8549 | |

* cited by examiner

| 1 | 2 | 3 | .. | 8 | 9 | 10 | ... | 47 | 48 | 49 | ... | 80 | 81 |

Fig.2a

| 1 | 2 | 3 | .. | 8 | 48 | 9 | ... | 47 | 48 | 49 | ... | 80 | 81 |

Fig.2b

| 1 | 2 | 3 | .. | 8 | 48 | 9 | ... | 47 | 49 | 50 | ... | 80 | 81 |

Fig.2c

METHODS AND SYSTEMS FOR RENDERING MULTIMEDIA CONTENT ON A USER DEVICE

TECHNICAL FIELD

This disclosure relates generally to multimedia content, and more particularly to methods and systems for rendering multimedia content on a user device.

BACKGROUND

A user consuming an interactive multimedia content such as a movie, a video, or text may have varied interest in different portions of multimedia content being rendered. This variation in interest may be attributed to personality of the user. While consuming the multimedia content, the user may be more interested in a particular portion of the multimedia content and may request for more information about the particular portion. In existing methods of rendering multimedia content, the user may have to browse internet and fetch the information manually.

Upon customizing the multimedia content based on user preferences, the multimedia content being rendered may lack continuity or flow. The existing methods fail to maintain continuity in the multimedia content upon customization in the multimedia content based on the user preferences. Moreover, the existing methods of rendering multimedia content fail to modify time duration of the multimedia content. Also, the existing methods lack to provide a mechanism to blend multimedia content from multiple sources and render as one entity for a user-defined time duration in real time.

SUMMARY

In one embodiment, a method for rendering multimedia content on a user device is disclosed. The method includes receiving, by a content rendering device, multimedia content from a multimedia server. The multimedia content is stored in the multimedia server in form of chunks. The method includes transforming, by the content rendering device, at least one chunk of the multimedia content based on user preferences. The transforming comprises adjusting time duration of the multimedia content based on a user-defined time duration. Further, the method includes rendering, by the content rendering device, the transformed multimedia content on the user device.

In one embodiment, a content rendering device for rendering multimedia content on a user device is disclosed. The content rendering device includes a processor and a memory communicatively coupled to the processor, wherein the memory stores processor instructions, which, on execution, causes the processor to receive multimedia content from a multimedia server. The multimedia content is stored in the multimedia server in form of chunks. The processor instructions causes the processor to transform at least one chunk of the multimedia content based on user preferences. The at least one chunk of the multimedia content is transformed by adjusting time duration of the multimedia content based on a user-defined time duration. The processor instructions further causes the processor to render the transformed multimedia content on the user device.

In one embodiment, a non-transitory computer-readable storage medium is disclosed. The non-transitory computer-readable storage medium has stored thereon, a set of computer-executable instructions for causing a computer including one or more processors to perform steps comprising receiving multimedia content from a multimedia server, wherein the multimedia content is stored in the multimedia server in form of chunks. The steps further include transforming at least one chunk of the multimedia content based on user preferences, wherein transforming includes adjusting time duration of the multimedia content based on a user-defined time duration. The steps further include rendering the transformed multimedia content on the user device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2a to 2c is an exemplary representation of sequence of chunks in multimedia content.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for rendering multimedia content on a user device. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Working of the systems and methods for rendering multimedia content on a user device is described in conjunction with FIGS. 1-5. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
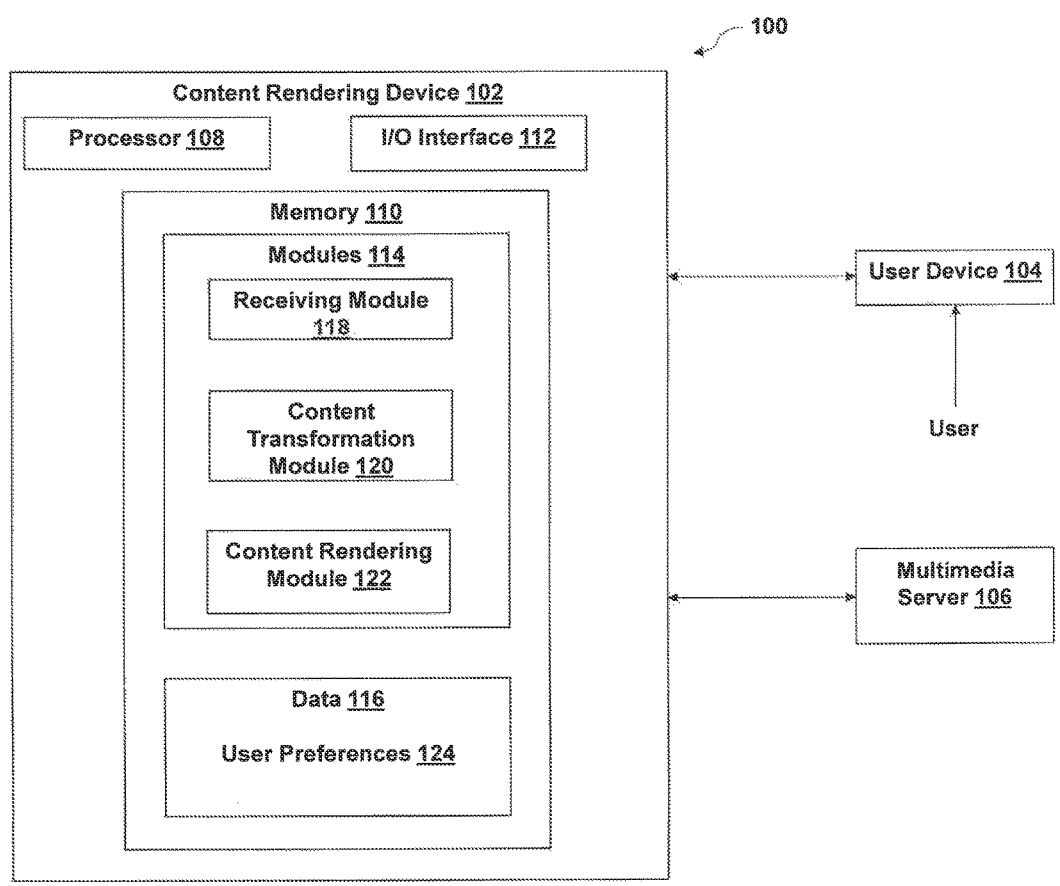
FIG. 1 illustrates an exemplary network implementation comprising a content rendering device for rendering multimedia content on a user device, according to some embodiments of the present disclosure.

FIG. 1 illustrates an exemplary network implementation 100 comprising a content rendering device 102 for rendering multimedia content on a user device 104, according to some embodiments of the present disclosure. As shown in the FIG. 1, the content rendering device 102 is communicatively coupled to the user device 104 and a multimedia server 106. The user device 104 may be, but is not limited to, a Personal Digital Assistant (PDA), any wireless user device, a desktop, a laptop, a tablet, or a phablet. The content rendering device 102 may transform multimedia content received from the multimedia server 106. The multimedia content may be transformed based on user preferences. In one embodiment, the user preferences may be provided as an input by a user on a user interface of the user device 104. In another embodiment, the user preferences may be stored in memory 110 of the content rendering device 102. Further, the transformed multimedia content may be rendered on the user interface of the user device 104.

The content rendering device 102 may be communicatively coupled to the user device 104 and the multimedia server 106 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in the FIG. 1, the content rendering device 102 comprises a processor 108, the memory 110 coupled to the processor 108, and input/output (I/O) interface(s) 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 110. The memory 110 can include any non-transitory computer-readable medium known in the art including, for example, volatile memory (e.g., RAM), and/or non-volatile memory (e.g., EPROM, flash memory, etc.).

The I/O interface(s) 112 may include a variety of software and hardware interfaces, for example, a web interface, a graphical user interface, etc., allowing the content rendering device 102 to interact with the user device 104. Further, the I/O interface(s) 112 may enable the content rendering device 102 to communicate with other computing devices. The I/O interface(s) 112 can facilitate multiple communications within a wide variety of networks and protocol types, including wired networks, for example LAN, cable, etc., and wireless networks such as WLAN, cellular, or satellite. The I/O interface(s) 112 may include one or more ports for connecting a number of devices to each other or to another server.

In one implementation, the memory 110 includes modules 114 and data 116. In one example, the modules 114, amongst other things, include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by one or more hardware components, by computer-readable instructions executed by a processing unit, or by a combination thereof.

In one implementation, the data 116 serves, amongst other things, as a repository for storing data fetched, processed, received and generated by one or more of the modules 114. The data 116 may include user preferences 124 provided by the user through the I/O interface 112. Hereinafter, the user preferences 124 may be referred as user preferences. The user preferences may include, but is not limited to, a user-defined time duration of the multimedia content to be rendered, a user selected portion of the multimedia content, or request for additional content. In one embodiment, the user selected portion of the multimedia content may be selected by the user by marking a start point and end point on the multimedia content through the user interface of the user device 104. In another embodiment, the user may provide the start point and end point of the multimedia content as an input to the content rendering device 102 through the I/O interface 112.

In one embodiment, the data 116 may be stored in the memory 110 in the form of various data structures. Additionally, the aforementioned data can be organized using data models, such as relational or hierarchical data models. In an example, the data 116 may also comprise other data used to store data, including temporary data and temporary files, generated by the modules 114 for performing the various functions of the content rendering device 102.

In one implementation, the modules 114 further include a receiving module 118, a content transformation module 120, and a content rendering module 122. In an example, the modules 114 may also comprise other modules. The other modules may perform various miscellaneous functionalities of the content rendering device 102. It will be appreciated that such aforementioned modules may be represented as a single module or a combination of different modules.

In order to render multimedia content on the user device 104, the receiving module 118 may receive multimedia content from the multimedia server 106. The multimedia content may include, but is not limited to, a video, an audio, text, images, or interactive content. The multimedia content may be stored in the multimedia server 106 in form of chunks. Each chunk in the multimedia content may be associated with metadata. The metadata includes time duration of a chunk and a subsequent chunk to be rendered. The representation of metadata associated with the chunks of the multimedia content is explained in detail in conjunction with the FIG. 3.

Each chunk of the multimedia content is independent and may represent a scene, an episode, or a topic. A chunk may include multiple frames. The chunk cannot have a single frame meaningfully as persistence of vision requires a minimum number of frames to be rendered per second to be comprehensible. In one embodiment, the chunks in the multimedia content are related to at least one of a scene change and a context change. A boundary of chunk may be the scene change or the context change. The scene change in the multimedia content may be identified using a scene change detection algorithm. A scene change in the multimedia content relates to a change in an object shown in a scene of the multimedia content. On the other hand, a context change in the multimedia content relates to a change in scene description. In one embodiment, if the object shown in a scene is not referred subsequently, that point in the multimedia content is identified as context change. In an example, consider that the scene in a video is related to Indian historical monuments and the object being referred to in the scene is Taj Mahal. If Taj Mahal is not referred in subsequent chunk of the video, then the point in the video at which Taj Mahal is stopped being referred to may be identified as context change.

Upon receiving the multimedia content from the multimedia server 106, the content transformation module 120 may transform at least one chunk of the multimedia content based on the user preferences. The user preferences may include, but is not limited to, a user-defined time duration of the multimedia content to be rendered, a user selected portion of the multimedia content, or a request for additional content. The user selected portion of the multimedia content may be selected by the user by marking a start point and an end point on the multimedia content through a user interface of the user device 104. The user may request for the additional content related to the multimedia content through a text message or an audio message through the user interface of the user device 104. The user preferences provided as an input by the user through the user interface of the user device 104 in real time may be stored in the memory 110 of the content rendering device 102 for further processing.

Upon receiving the user preference related to the user-defined time duration of the multimedia content, the content transformation module 120 may adjust time duration of the multimedia content. In one embodiment, the content transformation module 120 may compute time duration of chunks from start of the multimedia content to end of the multimedia content along different paths in the multimedia content. A path including chunks of total time duration equivalent to the user defined time duration may be chosen to be rendered on the user device 104. If more than one path of the different paths includes chunks of total time duration equivalent to the user defined time duration, a path may be chosen based on historical selections, user preferences, or randomly.

In one embodiment, the adjusting of the time duration of the multimedia content may include removing one or more frames in at least one chunk of the multimedia content if the user-defined time duration is less than the time duration of the multimedia content. The frames from a longest chunk or a least important chunk may be removed. In one embodiment, a ranking for chunks of the multimedia content based on relevance of the chunk in the multimedia content may be pre-defined. If the ranking of the chunk is below a pre-defined threshold ranking, then the chunk may be determined as the least important chunk. In one embodiment, the least important chunk may be dynamically determined based on relevance of a chunk in the multimedia content. The relevance of the chunk of the multimedia content may be determined based on different parameters. The parameters may include but is not limited to, lack of variations in audio sound levels when the chunk is being rendered, lack of change in objects shown in the chunk of the multimedia content, lack of reference to the objects shown in the multimedia content in subsequent chunks, or presence of repetitive actions in the chunk of the multimedia content.

In one embodiment, the removing of the frames may include removing redundant actions from a scene of the multimedia content. The scene may include one or more chunks of the multimedia content. The redundant actions may include actions that repeat over many frames. The redundant actions may be identified through a Long Short Time Memory (LSTM) neural network. Alternatively, an action that is not referred in subsequent frames may be removed by the content transformation module 120.

For example, if original time duration of a video of a person traveling in a bus is 5 mins and the user is interested in watching a condensed video of 10 seconds, then the content transformation module 120 may remove the frames from a chunk of the multimedia content. The frames may include redundant actions or the actions that are not referred in subsequent frames. In the above example, the redundant actions may include a conductor instructing the person travelling in the bus to purchase a bus ticket more than once. Further, the action that is not referred in subsequent frames may be an action of paying money to the conductor for the bus ticket. Upon identifying such actions by a LSTM neural network, the content transformation module 120 may remove such actions to condense the length of the video to 10 seconds without altering meaning of the original video.

In another embodiment, adjusting the time duration of the multimedia content may include expanding one or more chunks in the multimedia content based on a user preference if the user defined time duration is more than the time duration of the multimedia content. In one embodiment, the chunks may be expanded by inserting additional content to the chunks. In one embodiment, the additional content may be dynamically fetched by browsing Internet using keywords. The keywords may be extracted from at least one of a user input and text description of the multimedia content. The user input may include a text description of the scene being rendered or a text description of the additional content to be inserted. If the text description of the multimedia content is not provided by the user, the content transformation module 120 may implement a scene description algorithm for generating a descriptive text of a scene in the multimedia content. The scene description algorithm may use a convolution neural network to generate a text description for the scene or actions depicted in the scene.

Upon generating the text description of the scene, keywords may be extracted from the text description. The keywords may be extracted from the text description using a natural language processing algorithm. After extracting the keywords, a search query may be generated from the keywords to browse content available on the internet. The content matching with the text description of the multimedia content may be dynamically fetched as additional content. Further, the content transformation module 120 may insert the additional content to the chunks of the multimedia content to expand the time duration of the multimedia content.

In an example, consider that the original time duration of a video of Antony speech in Julius Caesar is 40 mins and the user is interested in watching an extended video of 2 hours, then content transformation module 120 may expand one or more chunks to expand the time duration of the video to 2 hours. The content transformation module 120 may dynamically fetch additional content to be inserted from user comments on social media sites related to Julius Caesar, or other videos, audio messages, or text content related to Julius Caesar available on the Internet.

Upon transforming the multimedia content either by removing chunks or by expanding chunks, the content rendering module 120 may render the transformed multimedia content on the user interface of the user device 104.

In another embodiment, the user preference may be the request for additional content. In one embodiment, the additional content may be dynamically fetched from the internet. Alternatively, the additional content may be available in upcoming chunks of the multimedia content being rendered. If the additional content is available in an upcoming chunk, the content transformation module 120 may modify sequence of one or more chunks of the multimedia content. The content transformation module 120 may insert the upcoming chunk after current chunk of the multimedia content. Upon inserting the upcoming chunk, the sequence of the chunks may be modified by deleting the upcoming chunk from its original location in the multimedia content.

In an example, consider the sequence of the chunks shown in the FIG. 2*a* as the original sequence of the chunks of the multimedia content.

Upon receiving the user request for additional content at chunk 8, the content transformation module 120 may insert chunk 48 after chunk 8 as the additional content is available in upcoming chunk, chunk 48. Upon insertion of the chunk 48 after chunk 8 sequence of the chunks in the multimedia content is as shown in the sequence depicted in FIG. 2*b*.

Upon insertion of the chunk 48 after chunk 8, the content transformation module 120 may delete the chunk 48 from its original location as shown in the sequence of the chunks depicted in the FIG. 2*c*.

In one embodiment, upon modifying the sequence of the chunks, the transformed multimedia content may be rendered on the user device 104. In another embodiment, the content transformation module 120 may generate a summary of chunk 48. The summarized chunk of chunk 48 may be inserted at original location of the chunk 48 i.e. after chunk 47 for ensuring a smooth transition of the multimedia content from chunk 47 to chunk 49. Thus, continuity or flow of the multimedia content being rendered is maintained even after transformation or customization of the chunks of the multimedia content based on the user preferences.

Upon inserting the summarized chunk, the content transformation module 120 may remove one or more frames of a chunk of the multimedia content if the time duration of the multimedia content is more than the user defined time duration. Upon removing the one or more frames, the transformed multimedia content may be rendered by the content rendering module 120 on the user device 104.

In one embodiment, the user preference may be a request to generate a summary of the content being rendered on the user device 104. The user may request to generate a summary of a portion of the multimedia content or the entire multimedia content. The portion of the multimedia content may be selected by the user by marking start point and end point on the multimedia content through the user interface of the user device 104.

Upon receiving the user preference, the content transformation module 120 may transform the multimedia content by generating a summary for one or more chunks in the multimedia content based on the portion of the multimedia content selected by the user. The summary of the chunks in the portion of the multimedia content may be generated by any content summarization algorithms. Upon generating the summary, the transformed multimedia content i.e. the summary may be rendered on the user interface of the user device 102.

In one example of rendering multimedia content on the user device 104, consider that the multimedia content to be rendered is a Human Resource (HR) policy video of a company. The time duration of the HR policy video is 6 hours. The HR policy is required to be transformed based on user preferences of three employees, John, Tom, and Jerry. John may specify the user defined time duration as 3 hours, Tom may specify the user defined time duration as 2 hours, and Jerry may specify the user defined time duration as 4 hours. The content transformation module 120 may generate a summary of the HR policy video of 3 hours, 2 hours, and 4 hours for Tom, John, and Jerry respectively.

In an example scenario, consider that Jerry requests for additional content on time sheet filling. In one embodiment, if the information related to time sheet filling is available in upcoming chunks, the content transformation module 120 may insert the upcoming chunks related to time sheet filling after the current chunk in the HR policy video. Upon inserting the upcoming chunks after the current chunk, the upcoming chunks may be deleted from its original location in the HR policy video. Upon modifying the sequence of the chunks, the content transformation module 120 may generate summarized chunks for content related to timesheet filling. The summarized chunks may be inserted at the original location of the chunks related to timesheet filling for ensuring continuity in the HR policy video. Further, the content transformation module 120 may remove one or more frames from chunks in the video if the time duration of the HR policy video is more than 4 hours. Thus, transformed video may be generated based on user preference of Jerry. The transformed video may be rendered on the user interface of the user device 104.

In another example scenario, consider that John requests for additional content on holiday calendar of current year that is not present in the HR policy video. The content transformation module 120 may dynamically browse the internet (company website) to fetch additional content related to the holiday calendar of current year. The additional content may be inserted in the HR policy video after the current chunk. Thus, the HR policy video may be customized or transformed based on user preferences dynamically.

Figure 3:
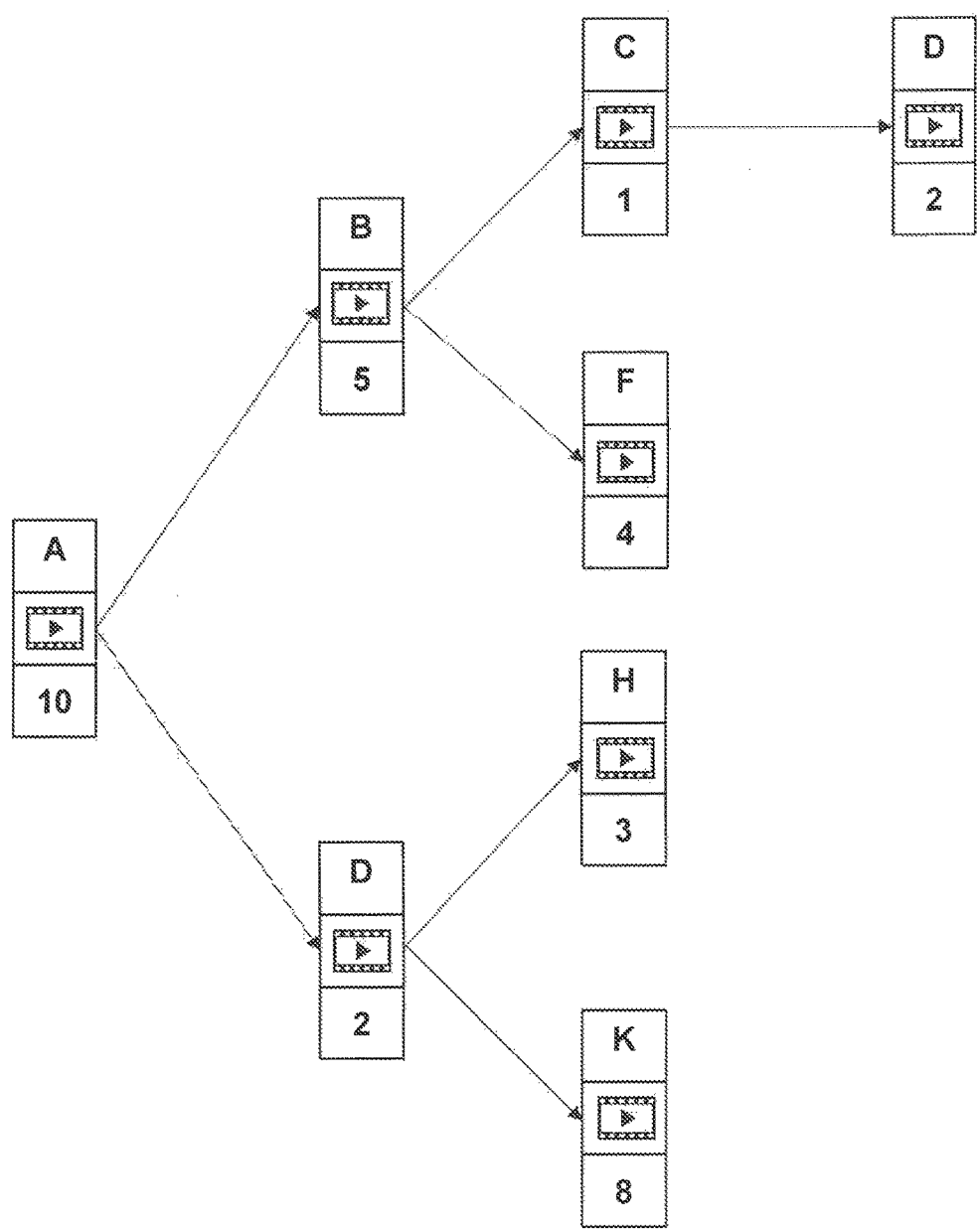
FIG. 3 is a representation of metadata associated with chunks of the multimedia content, in accordance with some embodiments of the present disclosure.

FIG. 3 is a representation of metadata associated with a chunk of the multimedia content, in accordance with some embodiments of the present disclosure. As shown in the FIG. 3, the metadata associated with the chunk A is time duration of chunk A, i.e. 10 units and subsequent chunks to be rendered, i.e. chunk B or chunk D. Similarly, the metadata associated with the chunk B is the time duration of the chunk B, i.e. 5 units and the subsequent chunk to be rendered, i.e. chunk C and chunk F.

Moreover, the metadata associated with the chunk C is time duration of the chunk C, i.e. 1 unit and subsequent chunk to be rendered, i.e. chunk D. The metadata associated with the chunk D is time duration of the chunk D, i.e. 2 units and the subsequent chunk to be rendered, i.e. chunk H or chunk K. The metadata associated with the chunk H is time duration of the chunk H, i.e. 3 units. Similarly, the metadata associated with the chunk K is 8 units.

Figure 4:
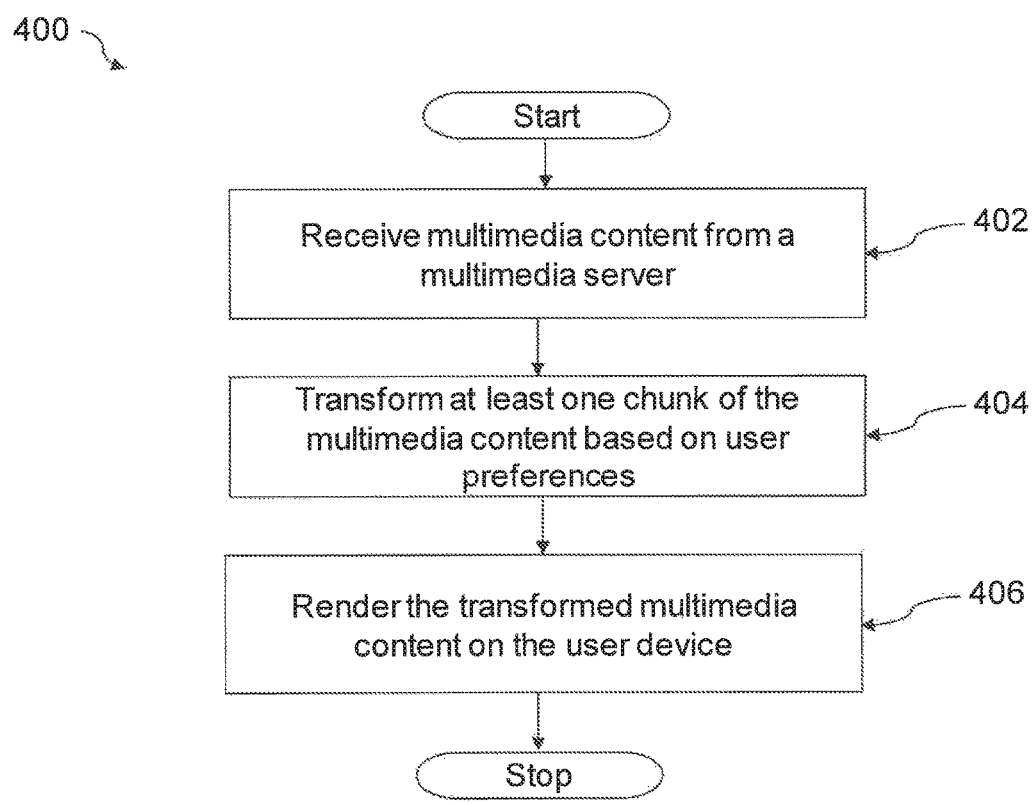
FIG. 4 is a flow diagram illustrating a method for rendering multimedia content on a user device, in accordance with some embodiments of the present disclosure.

FIG. 4 is a flow diagram illustrating a method 400 for rendering multimedia content on a user device, in accordance with some embodiments of the present disclosure.

The method 400 may be described in the general context of computer executable instructions. Generally, computer executable instructions can include routines, programs, objects, components, data structures, procedures, modules, and functions, which perform particular functions or implement particular abstract data types. The method 400 may also be practiced in a distributed computing environment where functions are performed by remote processing devices that are linked through a communication network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternative methods. Additionally, individual blocks may be deleted from the method 400 without departing from the spirit and scope of the subject matter described herein. Furthermore, the method 400 can be implemented in any suitable hardware, software, firmware, or combination thereof.

With reference to the FIG. 4, at block 402, multimedia content may be received from the multimedia server 106. The multimedia content may include, but is not limited to, a video, an audio, text, images, or interactive content. The multimedia content may be stored in the multimedia server 106 in form of chunks. Each chunk in the multimedia content may be associated with metadata. The metadata includes time duration of a chunk and a subsequent chunk to be rendered.

Moreover, the chunks in the multimedia content are related to at least one of a scene change and a context change. A scene change in the multimedia content may be identified using a scene change detection algorithm. A scene change in the multimedia content relates to a change in an object shown in a scene of the multimedia content. On the other hand, a context change in the multimedia content relates to a change in scene description. In one embodiment, if the object shown in a scene is not referred subsequently, that point in the multimedia content is identified as context change. The receiving of the multimedia content is explained in detail in conjunction with the FIG. 1.

At block 404, at least one chunk of the multimedia content may be transformed based on user preferences. The user preferences may include, but is not limited to, a user-defined time duration of the multimedia content to be rendered, a user selected portion of the multimedia content, or request for additional content. The user selected portion of the multimedia content may be selected by the user by marking a start point and an end point on the multimedia content through a user interface of the user device 104. The user may request for the additional content related to the multimedia content through text or audio.

The chunk of the multimedia content may be transformed by the content transformation module 120. Upon receiving the user preference related to the user-defined time duration of the multimedia content, the content transformation module 120 may adjust time duration of the multimedia content. In one embodiment, the content transformation module 120 may compute time duration of chunks from start of the multimedia content to end of the multimedia content along different paths in the multimedia content. A path including chunks of total time duration equivalent to the user defined time duration may be chosen to be rendered on the user device 104. If more than one path of the different paths includes chunks of total time duration equivalent to the user defined time duration, a path may be chosen based on historical selections, user preferences, or randomly.

In one embodiment, the adjusting of the time duration of the multimedia content may include removing one or more frames in at least one chunk of the multimedia content if the user-defined time duration is less than the time duration of the multimedia content.

In another embodiment, adjusting the time duration of the multimedia content comprises expanding one or more chunks in the multimedia content based on a user preference if the user defined time duration is more than the time duration of the multimedia content. In one embodiment, the chunks may be expanded by inserting additional content to the chunks. In one embodiment, the additional content is dynamically fetched by browsing internet using keywords. The keywords are extracted from at least one of a user input and text description of the multimedia content.

In one embodiment, the user preference may be the request for additional content. In one embodiment, the additional content may be dynamically fetched from the internet. Alternatively, the additional content may be available in upcoming chunks of the multimedia content being rendered. If the additional content is available in an upcoming chunk, the content transformation module 120 may modify sequence of one or more chunks of the multimedia content. The content transformation module 120 may insert the upcoming chunk after current chunk of the multimedia content. Upon inserting the upcoming chunk, the sequence of the chunks is modified by deleting the upcoming chunk from its original location in the multimedia content to generate the transformed multimedia content. The transforming of the chunk of the multimedia content is explained in detail in conjunction with the FIG. 1

At block 406, the transformed multimedia content may be rendered on the user device 104.

Computer System

Figure 5:
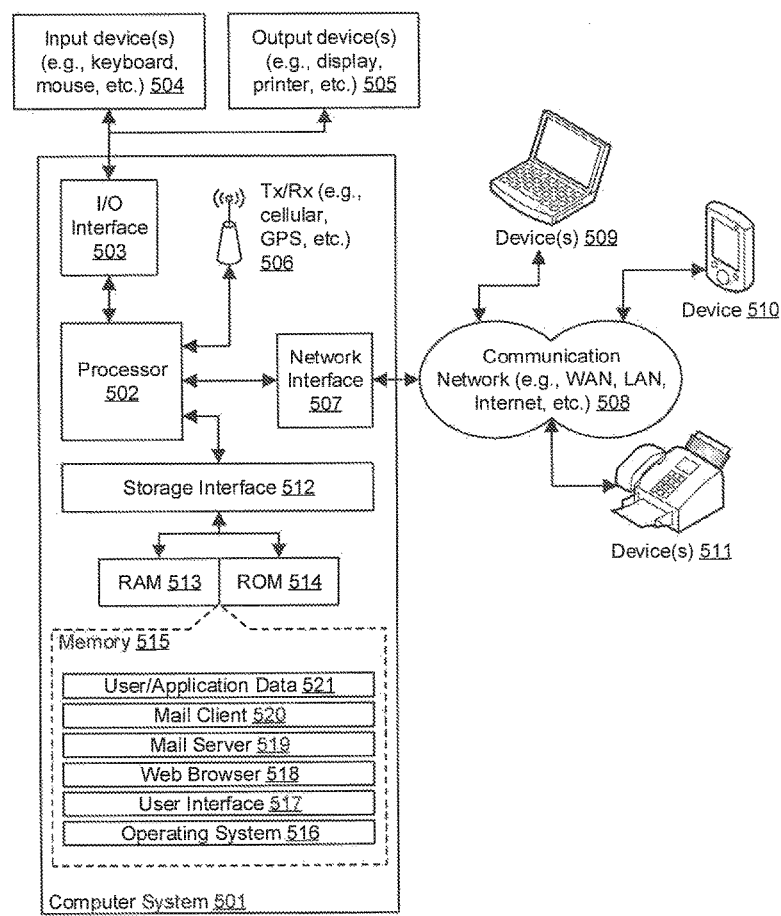
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the receiving module 118, the content transformation module 120, and the content rendering module 122. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for rendering multimedia content on a user device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for rendering multimedia content on a user device, the method comprising:
   receiving, by a content rendering device, multimedia content from a multimedia server, wherein the multimedia content is stored in the multimedia server in form of chunks;
   transforming, by the content rendering device, at least one chunk of the multimedia content based on user preferences, wherein transforming comprises modifying, by a content transformation module of the content rendering device, a sequence of one or more chunks of the multimedia content, and adjusting, by the content transformation module, a time duration of the multimedia content based on a user-defined time duration,
   wherein modifying the sequence of one or more chunks of the multimedia content comprises:
      inserting, at a location subsequently adjacent to a current chunk of the media content, an upcoming chunk from a subsequent location of the multimedia content;
      generating, by the content transformation module, a summary of the upcoming chunk located at the subsequent location of the multimedia content; and
      replacing the upcoming chunk located at the subsequent location of the multimedia content with the summary of the upcoming chunk to ensure a smooth transition of the multimedia content, and
   wherein adjusting the time duration of the multimedia content comprises:
      determining a plurality of paths, each path of the determined plurality of paths comprising one or more chunks corresponding to multimedia content that is to be used for transforming the multimedia content, wherein the one or more chunks in each path of the determined plurality of paths are arranged in a pre-defined sequence;
      computing a cumulative time duration for each path of the determined plurality of paths based on a time duration associated with each path of the one or more chunks included in each path;
      selecting a path from the determined plurality of paths based on the cumulative time duration and the user-defined time duration, wherein the selection and the pre-defined sequence is based on historical selections of one or more paths by the user;
      in response to more than one path of the determined plurality of paths includes chunks of total time duration equivalent to the user-defined time duration based on the computing, selecting the path from the more than one paths of the determined plurality of paths based on historical selections; and
   rendering, by the content rendering device, the transformed multimedia content on the user device.

2. The method of claim 1, wherein adjusting the time duration of the multimedia content further comprises:
   removing one or more frames in the at least one chunk of the multimedia content if the user-defined time duration is less than the time duration of the multimedia content.

3. The method of claim 1, wherein adjusting the time duration of the multimedia content further comprises:
   expanding the one or more chunks in the multimedia content based on a user preference if the user defined time duration is more than the time duration of the multimedia content, wherein expanding the one or more chunks comprises inserting additional content to the one or more chunks.

4. The method of claim 3, wherein the additional content is dynamically fetched by browsing internet using keywords, wherein the keywords are extracted from at least one of a user input and text description of the multimedia content.

5. The method of claim 1, wherein each of the chunks in the multimedia content is associated with metadata, wherein the metadata comprises time duration of a chunk and a subsequent chunk to be rendered.

6. The method of claim 1, wherein each of the chunks in the multimedia content are related to at least one of a scene change and a context change.

7. The method of claim 1, wherein modifying the sequence of one or more chunks of the multimedia content comprises generating the summary for one or more chunks in the multimedia content based on a user input.

8. A content rendering device for rendering multimedia content on a user device, the content rendering device comprising:
   a processor; and
   a memory communicatively coupled to the processor, wherein the memory stores processor instructions, which, on execution, causes the processor to:
      receive multimedia content from a multimedia server, wherein the multimedia content is stored in the multimedia server in form of chunks;
      transform at least one chunk of the multimedia content based on user preferences, wherein the at least one chunk of the multimedia content is transformed by modifying a sequence of one or more chunks of the multimedia content, and adjusting time duration of the multimedia content based on a user-defined time duration,
wherein modifying the sequence of one or more chunks of the multimedia content comprises:
inserting, at a location subsequently adjacent to a current chunk of the media content, an upcoming chunk from a subsequent location of the multimedia content;
generating a summary of the upcoming chunk located at the subsequent location of the multimedia content; and
replacing the upcoming chunk located at the subsequent location of the multimedia content with the summary of the upcoming chunk to ensure a smooth transition of the multimedia content, and
wherein adjusting the time duration of the multimedia content comprises:
determining a plurality of paths, each path of the determined plurality of paths comprising one or more chunks corresponding to multimedia content that is to be used for transforming the multimedia content, wherein the one or more chunks in each path of the determined plurality of paths are arranged in a pre-defined sequence;
computing a cumulative time duration for each path of the determined plurality of paths based on a time duration associated with each path of the one or more chunks included in each path;
selecting a path from the determined plurality of paths based on the cumulative time duration and the user-defined time duration, wherein the selection and the pre-defined sequence is based on historical selections of one or more paths by the user;
in response to more than one path of the determined plurality of paths includes chunks of total time duration equivalent to the user-defined time duration based on the computing, selecting the path from the more than one paths of the determined plurality of paths based on historical selections; and
render the transformed multimedia content on the user device.

9. The content rendering device of claim 8, wherein the processor instructions to adjust the time duration of the multimedia content further comprises:
removing one or more frames in the at least one chunk of the multimedia content if the user-defined time duration is less than the time duration of the multimedia content.

10. The content rendering device of claim 8, wherein the processor instructions to adjust the time duration of the multimedia content further comprises:
expanding the one or more chunks in the multimedia content based on a user preference if the user defined time duration is more than the time duration of the multimedia content, wherein expanding the one or more chunks comprises inserting additional content to the one or more chunks.

11. The content rendering device of claim 10, wherein the additional content is dynamically fetched by browsing internet using keywords, wherein the keywords are extracted from at least one of a user input and text description of the multimedia content.

12. The content rendering device of claim 8, wherein each of the chunks in the multimedia content is associated with metadata, wherein the metadata comprises time duration of a chunk and a subsequent chunk to be rendered.

13. The content rendering device of claim 8, wherein each of the chunks in the multimedia content are related to at least one of a scene change and a context change.

14. The content rendering device of claim 8, wherein the processor instructions to transform the at least one chunk of the multimedia content based on user preferences comprise generating the summary for one or more chunks in the multimedia content based on a user input.

15. A non-transitory computer-readable storage medium having stored thereon, a set of computer-executable instructions for causing a computer comprising one or more processors to perform steps comprising:
receiving multimedia content from a multimedia server, wherein the multimedia content is stored in the multimedia server in form of chunks;
transforming at least one chunk of the multimedia content based on user preferences, wherein transforming comprises modifying a sequence of one or more chunks of the multimedia content, and adjusting time duration of the multimedia content based on a user-defined time duration,
wherein modifying the sequence of one or more chunks of the multimedia content comprises:
inserting, at a location subsequently adjacent to a current chunk of the media content, an upcoming chunk from a subsequent location of the multimedia content;
generating a summary of the upcoming chunk located at the subsequent location of the multimedia content; and
replacing the upcoming chunk located at the subsequent location of the multimedia content with the summary of the upcoming chunk to ensure a smooth transition of the multimedia content, and
wherein the adjusting of the time duration of the multimedia content comprises:
determining a plurality of paths, each path of the determined plurality of paths comprising one or more chunks corresponding to multimedia content that is to be used for transforming the multimedia content, wherein the one or more chunks in each path of the determined plurality of paths are arranged in a pre-defined sequence;
computing a cumulative time duration for each path of the determined plurality of paths based on a time duration associated with each path of the one or more chunks included in each path;
selecting a path from the determined plurality of paths based on the cumulative time duration and the user-defined time duration, wherein the selection and the pre-defined sequence is based on historical selections of one or more paths by the user;
in response to more than one path of the determined plurality of paths includes chunks of total time duration equivalent to the user-defined time duration based on the computing, selecting the path from the more than one paths of the determined plurality of paths based on historical selections; and
rendering the transformed multimedia content on the user device.

16. The non-transitory computer-readable storage medium of claim 15, wherein the steps for adjusting the time duration of the multimedia content comprises:

removing one or more frames in the at least one chunk of the multimedia content if the user-defined time duration is less than the time duration of the multimedia content.

17. The non-transitory computer-readable storage medium of claim 15, wherein the steps for adjusting the time duration of the multimedia content further comprise:
expanding the one or more chunks in the multimedia content based on a user preference if the user defined time duration is more than the time duration of the multimedia content, wherein expanding the one or more chunks comprises inserting additional content to the one or more chunks.

\* \* \* \* \*